(12) United States Patent
Green et al.

(10) Patent No.: US 8,681,782 B2
(45) Date of Patent: Mar. 25, 2014

(54) METHOD AND SYSTEM FOR ROUTING A VOICE-OVER-PACKET EMERGENCY SERVICES CALL TO AN APPROPRIATE PUBLIC SAFETY ANSWERING POINT (PSAP)

(71) Applicant: Sprint Spectrum L.P., Overland Park, KS (US)

(72) Inventors: Douglas R. Green, Lenexa, KS (US); Shingara S. Dhanoa, Overland Park, KS (US); Hal S. Beech, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/674,140

(22) Filed: Nov. 12, 2012

(65) Prior Publication Data
US 2013/0065550 A1    Mar. 14, 2013

Related U.S. Application Data

(63) Continuation of application No. 11/063,116, filed on Feb. 22, 2005, now abandoned.

(51) Int. Cl.
*H04L 12/66* (2006.01)

(52) U.S. Cl.
USPC ........................................ 370/352; 370/395.3

(58) Field of Classification Search
None
See application file for complete search history.

(56) References Cited

U.S. PATENT DOCUMENTS

| | | | |
|---|---|---|---|
| 6,427,001 B1 | 7/2002 | Contractor et al. | |
| 6,665,611 B1 | 12/2003 | Oran et al. | |
| 6,678,357 B2 | 1/2004 | Stumer et al. | |
| 6,744,859 B1 | 6/2004 | Koepke et al. | |
| 6,771,742 B2 | 8/2004 | McCalmont et al. | |
| 7,274,684 B2 | 9/2007 | Young et al. | |

(Continued)

FOREIGN PATENT DOCUMENTS

| | | |
|---|---|---|
| WO | WO03041377 A1 | 5/2003 |
| WO | WO2004095788 A1 | 11/2004 |
| WO | WO2004095852 A2 | 11/2004 |

OTHER PUBLICATIONS

H. Schulzrinne, Network Working Group, Internet Draft "Emergency Services URI for the Session Initiation Protocol," Feb. 8, 2004.

(Continued)

*Primary Examiner* — Marsha D Banks Harold
*Assistant Examiner* — Hooman Houshmand

(57) ABSTRACT

A plurality of public safety answering points (PSAPs) are accessible via a voice-over-packet (VoP) network. A wireless access point of the VoP network is provisioned with a PSAP identifier and/or access point identifier to facilitate the routing of emergency services calls from the wireless access point to the appropriate PSAP. When a mobile node transmits a message to originate a call, the wireless access point parses the message to determine whether the mobile node is requesting an emergency services call. If an emergency call is being requested, the wireless access point inserts the PSAP identifier and/or access point identifier with which it has been provisioned into the message and forwards the modified message to a proxy server. The proxy server receives the modified message and routes the call to the appropriate PSAP, based on the PSAP identifier and/or access point identifier contained therein.

14 Claims, 3 Drawing Sheets

(56) References Cited

U.S. PATENT DOCUMENTS

| | | |
|---|---|---|
| 2003/0063714 A1* | 4/2003 | Stumer et al. .................... 379/37 |
| 2003/0109245 A1 | 6/2003 | McCalmont et al. |
| 2004/0057425 A1* | 3/2004 | Brouwer et al. ............. 370/352 |
| 2004/0184584 A1 | 9/2004 | McCalmont et al. |
| 2004/0190497 A1 | 9/2004 | Knox |
| 2004/0192271 A1 | 9/2004 | Eisner et al. |
| 2004/0249927 A1 | 12/2004 | Pezutti |
| 2005/0014482 A1 | 1/2005 | Holland et al. |
| 2005/0014517 A1 | 1/2005 | Holland et al. |
| 2005/0020241 A1 | 1/2005 | Holland et al. |
| 2005/0020242 A1 | 1/2005 | Holland et al. |
| 2005/0020280 A1 | 1/2005 | Holland et al. |
| 2005/0020281 A1 | 1/2005 | Holland et al. |
| 2005/0026589 A1 | 2/2005 | Holland et al. |
| 2005/0083911 A1 | 4/2005 | Grabelsky et al. |
| 2005/0123102 A1* | 6/2005 | Beason et al. .................. 379/45 |
| 2005/0174991 A1* | 8/2005 | Keagy ........................... 370/352 |
| 2005/0201359 A1* | 9/2005 | Nelson et al. ................. 370/352 |
| 2005/0213716 A1* | 9/2005 | Zhu et al. ........................ 379/45 |
| 2006/0030290 A1* | 2/2006 | Rudolf et al. ............. 455/404.1 |

OTHER PUBLICATIONS

H. Schulzrinne, Network Working Group, Internet Draft, "Emergency Services for Internet Telephony Systems," Oct. 18, 2004.

Avaya, Inc., "Comments on IP Telephony Support for Emergency Calling Service," TR 41.4.1/01-08-002, Jul. 25, 2001.

Intrado, Inc., "Informed Response, VoIP Emergency Calling Services," 2003.

Stephen Meer, "VoIP and 9-1-1—The Technology is Not the problem," Jan. 27, 2004.

Cisco Systems, Inc., "Cisco Emergency Responder Version 1.2(2)", Data Sheet, Sep. 2004.

Mark E. Crovella and Robert L. Carter, "Dynamic Server Selection in the Internet,"Proceedings of the 3rd IEEE HPCS'95 (1995).

Tariq et al., "Mobility Aware Server Selection for Mobile Streaming Multimedia Content Distribution Networks,"Proc. 8th Int. Workshop on Web Content Caching and Distribution (2003).

Donny Jackson, "Nortel proposes VoIP 911 solution," Mobile Radio Technology, May 1, 2004.

Schulzrinne, Internet Engineering Task Force, "Providing Emergency Call Services for SIP-based Internet Telephony," Internet draft, Jul. 13, 2000.

* cited by examiner

METHOD AND SYSTEM FOR ROUTING A VOICE-OVER-PACKET EMERGENCY SERVICES CALL TO AN APPROPRIATE PUBLIC SAFETY ANSWERING POINT (PSAP)

CROSS REFERENCE TO RELATED APPLICATIONS

This application is a continuation of U.S. application Ser. No. 11/063,116, filed Feb. 22, 2005, now abandoned.

BACKGROUND

1. Field of the Invention

The present invention relates to telecommunications and, more particularly, to methods and systems for routing an emergency services call that originates from an access point of a voice-over-packet (VoP) network to an appropriate public safety answering point (PSAP).

2. Description of Related Art

The ability to place an emergency services call by dialing 9-1-1 has become widespread throughout the United States. When a 9-1-1 call is placed, it is typically answered at a public safety answering point (PSAP). However, there are many PSAPs throughout the United States, each serving a particular area, such as a city, county, or metropolitan area. The public switched telephone network (PSTN) can route a 9-1-1 call to the appropriate PSAP, i.e., the PSAP that servers the caller's area, because the caller's telephone number is associated with a fixed location.

Increasingly, however, packet networks are being used for voice communications, including emergency services calls. Such voice-over-packet (VoP) networks often route calls that are placed by client devices that can change their point of connectivity to the VoP network. For example, a mobile node may be able to place calls over the VoP network from different access points at different locations. In many cases, the access points are wireless access points that wirelessly communicate with mobile nodes using an IEEE 802.11x or other wireless local area network (WLAN) protocol. Because of this mobility, mobile nodes and their associated telephone numbers may not be reliably associated with fixed geographic locations. Even so, it is desirable for a mobile node user to be able to dial 9-1-1 from any location and have the call routed through the VoP network to the appropriate PSAP, i.e., the PSAP that serves the user's current location.

Accordingly, there is a need for providing methods and systems for routing VoP emergency services calls to appropriate PSAPs.

SUMMARY

In a first principal aspect, an exemplary embodiment of the present invention provides a method for selectively routing calls in a network that includes a voice-over-packet (VoP) network and a plurality of answering points. In accordance with the method, an access point of the VoP network receives a message from a client device. The message requests establishment of a call. The access point transmits at least one predetermined identifier in signaling to set up the call. The call is routed to a particular answering point, from among the plurality of answering points, based on the at least one predetermined identifier.

In a second principal aspect, an exemplary embodiment of the present invention provides a system for selectively routing calls in a network that includes a VoP network and a plurality of public safety answering points (PSAPs). The system comprises: (i) an access point, communicatively coupled to the VoP network, that is provisioned with at least one identifier; and (ii) a proxy server that is communicatively coupled to the access point via the VoP network. The access point transmits the at least one identifier when the access point detects a request to establish an emergency services call. The proxy server routes the emergency services call to a particular PSAP, from among the plurality of PSAPs, based on the at least one identifier.

DETAILED DESCRIPTION OF EXEMPLARY EMBODIMENTS

1. Overview

Figure 1:
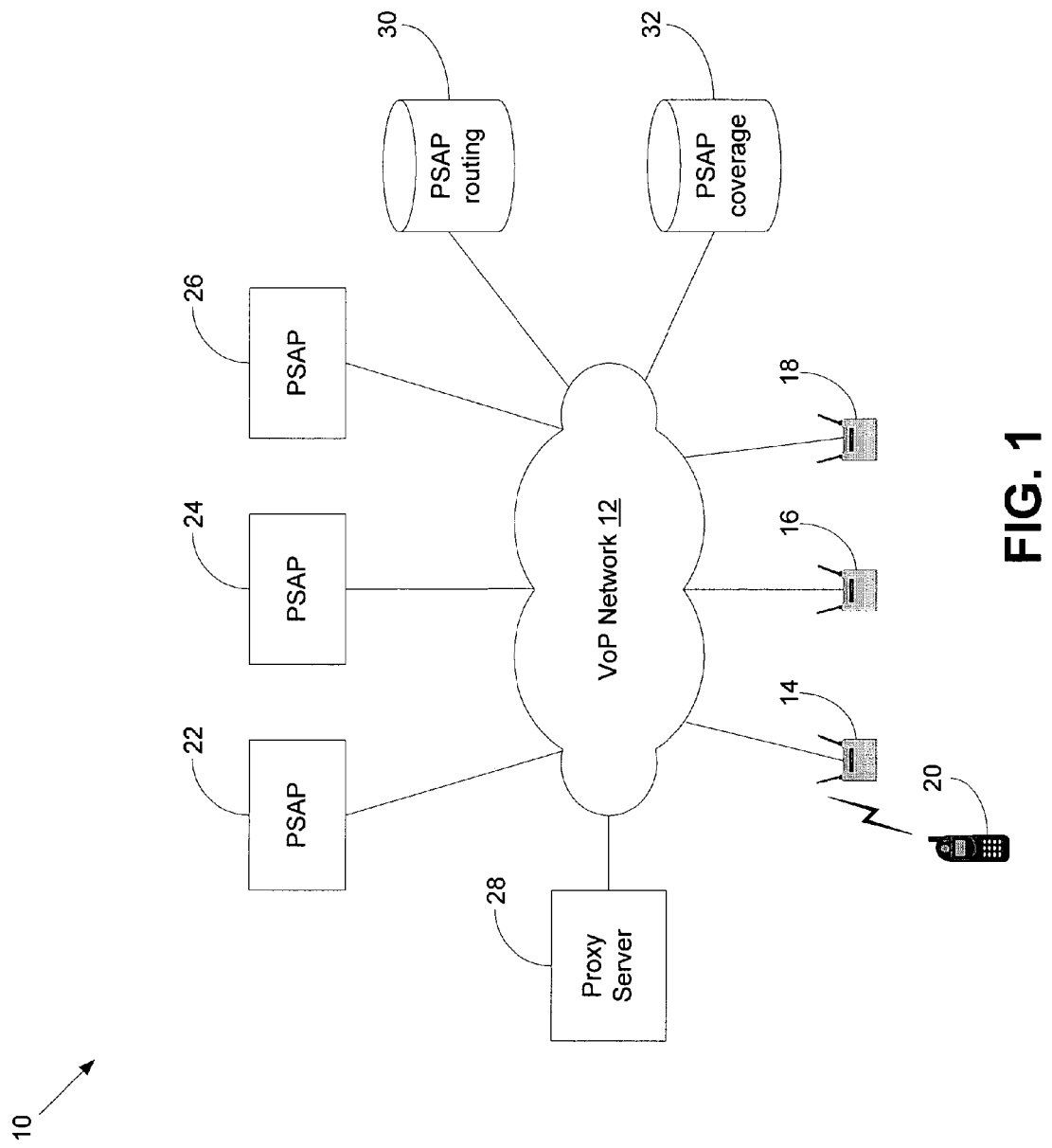
FIG. 1 is a simplified block diagram of a telecommunications network, in accordance with an exemplary embodiment of the present invention.

The present invention, in its exemplary embodiments, provides methods and systems for routing an emergency services call, such as a 9-1-1 call, in a voice-over-packet (VoP) network to a public safety answering point (PSAP) that is appropriate for answering the call. A VoP emergency services call may originate from a client device that is associated with a particular access point of the VoP network. The client device could be, for example, a mobile node, such as a wireless handset or laptop computer, and the access point could be a wireless access point that communicates with the mobile node over an air interface using an IEEE 802.11x, IEEE 802.16, HiperLAN, HomeRF, Bluetooth, or other wireless communications protocol.

Particular PSAPs may be appropriate for answering calls originating from particular access points. Which PSAP is appropriate for a particular access point may depend on the jurisdiction (e.g., city, town, or county) in which the access point is located and/or on the type of location (e.g., in an airport). Thus, emergency services calls originating from an access point located in a particular metropolitan area may be routed to a PSAP that serves that particular metropolitan area, rather than a neighboring area. However, emergency service calls originating from an access point located in an airport may be routed to a PSAP that serves that airport specifically (e.g., routed to an airport security PSAP) rather than to a PSAP that serves the metropolitan area generally.

To facilitate the routing of emergency services calls from the originating access points to the appropriate PSAPs, each access point may be provisioned with at least one identifier. In a first exemplary approach, the at least one identifier provisioned in an access point includes a PSAP identifier that corresponds to the particular PSAP that is appropriate for answer calls originating from that access point. When an access point receives a message from a client device that requests the establishment of an emergency services call, the access point may transmit the PSAP identifier with which the access point has been provisioned in signaling used to set up the call. For example, the access point may receive a message from a client device, determine that the message is requesting an emergency services call, and, responsively, insert the PSAP identifier into the message to provide a modified message. The access point may then transmit the modified message to a proxy server, e.g., as part of the call set-up signaling.

The proxy server receives the call set-up signaling with the PSAP identifier and uses the PSAP identifier to determine how to route the call to the appropriate PSAP. More particularly, the proxy server may use the PSAP identifier to query a PSAP routing database. The PSAP routing database may store the various PSAP identifiers for the PSAPs accessible via the VoP network and the routing addresses for routing calls through the VoP network to these PSAPS, such that the PSAP identifiers are mapped to the routing addresses of their corresponding PSAPs. In this way, the proxy server may send the PSAP routing database a query that includes that PSAP identifier transmitted by the access point, and the database may respond with a routing address that can be used to route the call to the PSAP corresponding to that PSAP identifier.

In a second exemplary approach, the at least one identifier provisioned in an access point includes an access point identifier that identifies the access point rather than the PSAP that serves it. When an access point receives a message from a client device that requests the establishment of an emergency services call, the access point may transmit the access point identifier with which the access point has been provisioned in the signaling to set up the call. For example, the access point may receive a message from a client device, determine that the message is requesting an emergency services call, and, responsively, insert the access point identifier into the message to provide a modified message. The access point may then transmit the modified message to a proxy server, e.g., as part of the call set-up signaling. This second approach may make use of a proxy server and a PSAP routing database, as described above, but it may also make use of a PSAP coverage database that maps access point identifiers to PSAP identifiers. In particular, when the proxy server receives the access point identifier transmitted by the originating access point, the proxy server may query the PSAP coverage database to determine the PSAP identifier of the PSAP that serves the area in which the identified access point is located. The proxy server may then use this PSAP identifier to query a PSAP routing database to obtain a routing address for the PSAP, as described above.

By the use of such PSAP identifiers and/or access point identifiers, a VoP emergency services call may be routed to the appropriate PSAP automatically. In this way, a mobile node user may dial a digit string, such as "911," which specifies an emergency services call without specifying which particular PSAP should answer the call, and have the call routed through the VoP network to the particular PSAP that serves the area in which the user is currently located, whether the user is currently at a home location or is roaming. Although the methods and systems described herein are particularly useful for selectively routing emergency services calls to appropriate PSAPs, it is to be understood that these methods and systems can also be employed for selectively routing other types of calls to other types of answering points.

2. Exemplary Network Architecture

Referring to the drawings, FIG. 1 is a simplified block diagram of an exemplary telecommunications network 10. Network 10 includes a voice-over-packet (VoP) network 12, which is a packet-switched network that conveys voice or other media in a packetized format. VoP network 12 may include one or more local area networks (LANs), which could be, for example, wireless local area networks (WLANs). VoP network 12 may also one or more wide area networks (WANs), which may include public networks, such as the Internet, and/or private networks.

In an exemplary embodiment, VoP network 12 routes packets based on network addresses, such as by using the Internet Protocol (IP) protocol in combination with the User Datagram Protocol (UDP) or Transmission Control Protocol (TCP). The IP packets may be carried over lower level protocols, such as asynchronous transfer mode (ATM) protocols. Application layer protocols, such as the Session Initiation Protocol (SIP), may be used to set up and control voice calls and other communication sessions through VoP network 12. Relevant aspects of SIP are described in Rosenberg, et al., "SIP: Session Initiation Protocol," Request for Comments 3261 (June 2002), which is incorporated herein by reference. VoP network 12 may carry the voice or other media in such calls, as UDP/IP or TCP/IP packets, in a real-time packet media format, e.g., by using the realtime transport protocol (RTP). Relevant aspects of RTP are described in Schulzrinne, et al., "RTP: A Transport Protocol for Real-Time Applications," Request for Comments 1889 (January 1996), which is incorporated herein by reference.

One or more access points may be communicatively coupled to VoP network 12 to allow client devices to access VoP network 12, e.g., to make voice calls, check e-mail, engage in Web browsing, or for other purposes. Client devices may communicate with such access points via either wired or wireless interfaces. However, in an exemplary embodiment, VoP network 12 is coupled to a plurality of wireless access points that communicate with client devices via a wireless interface, e.g., in accordance with IEEE 802.11x, IEEE 802.16, HiperLAN, HomeRF, or Bluetooth specifications. Such client devices may be mobile nodes, such as wireless handsets or laptop computers, that can access the VoP network via different wireless access points in different locations. For example, FIG. 1 shows VoP network 12 coupled to wireless access points 14, 16, and 18 and shows a mobile node 20 in communication with wireless access point 14 via an air interface, Although FIG. 1 shows three wireless access points, it is to be understood that a greater or fewer number of wireless access points could be coupled to VoP network 12.

Wireless access points 14, 16, and 18 each provide a wireless coverage area within which the wireless access point can wirelessly communicate with wireless devices, such as mobile node 20. In an exemplary embodiment, wireless access points 14, 16, and 18 are in different locations. Such locations may include business locations, residential locations, and public areas, such as airports. As a mobile node moves from one location to another, it may communicate with different wireless access points. For example, FIG. 1 shows mobile node 20 in wireless communication with wireless access point 14. However, mobile mode 20 may subsequently move out of the coverage area of wireless access point 14 and into the coverage area of wireless access point 16, so that mobile node 20 may communicate with wireless access point 16 instead of wireless access point 14.

Wireless access points 14, 16, and 18 may each be provisioned with information regarding their locations. Such location information may identify the location of the wireless access point in terms of a street address, in terms of a section, floor, or room of a building, and/or in terms of latitude and longitude. Alternatively, the wireless access points may obtain location information from the mobile nodes in communication with them. For example, a mobile node may use the Global Positioning System (GPS) to obtain its location and then convey that location to the wireless access point with which the mobile node is communicating.

VoP network 12 may be communicatively coupled to a plurality of public safety answering points (PSAPs). For example, FIG. 1 shows PSAPs 22, 24, and 26 communicatively coupled to VoP network 12. Although FIG. 1 shows three PSAPs for purposes of illustration, it is to be understood that VoP network 12 could be coupled to a greater or fewer number of PSAPs. In addition, although FIG. 1 shows PSAPs 22, 24, and 26 directly connected to VoP network 12, it is to be understood that one or more of these PSAPs could be indirectly connected to VoP network 12. For example, a PSAP may be connected to one or more circuit-switched elements, such as in the public switched telephone network (PSTN), which, in turn, may be communicatively coupled to VoP network 12 via a media gateway that converts between packet-switched and circuit-switched media formats.

PSAPs 22, 24, and 26 may each include an answering center that answers emergency services calls, such as 9-1-1 calls, on behalf of a public safety organization. Such public safety organizations may include, for example, law enforcement, fire protection, and/or medical assistance organizations. However, a public safety organization may provide services in only a particular geographic area (e.g., a particular city, town, county, or metropolitan area) or in only a particular type of location (e.g., in a particular airport). Accordingly, it is beneficial for an emergency services call to be answered at a PSAP that servers the caller's location.

For example, PSAP 22 may serve the area in which wireless access point 14 is located, PSAP 24 may serve the area in which wireless access point 16 is located, PSAP 26 and may serve the area in which wireless access point 18 is located. This means that emergency services calls originating from wireless access point 14 should be routed to PSAP 22, rather than to PSAP 24 or PSAP 26. Similarly, emergency services calls originating from wireless access point 16 should be routed to PSAP 24, and emergency services calls originating from wireless access point 18 should be routed to PSAP 26.

Wireless access points 14, 16, and 18 may each be provisioned with one or more identifiers that facilitate the routing of emergency services calls to the appropriate PSAP. Wireless access points 14, 16, and 18 may each store its respective one or more identifiers in its own local data store. Alternatively, the one or more identifiers provisioned for each of wireless access points 14, 16, and 18 may be stored in a separate data store, e.g., in a central database that wireless access points 14, 16, and 18 can access as needed.

The one or more identifiers can be selected in different ways. In one approach, each wireless access point 14, 16, and 18 is provisioned with a PSAP identifier that identifies the PSAP that serves the area in which the wireless access point is located. Thus, wireless access points 14, 16, and 18 may be provisioned with PSAP identifiers that identify PSAPs 22, 24, and 26, respectively.

In another approach, wireless access points 14, 16, and 18 may each be provisioned with an access point identifier that uniquely identifies the wireless access point for purposes of routing emergency services calls to the appropriate PSAP. The access point identifier of a wireless access point could be its MAC address. Alternatively, the access point identifier could be an application-layer identifier that identifies the wireless access point in an application layer protocol, such as SIP.

In still another approach, wireless access points 14, 16, and 18 may each be provisioned with both a PSAP identifier and an access point identifier, or with a different type of identifier altogether.

One or more network elements may function to route calls, such as emergency services calls, through VoP network 12. In an exemplary embodiment, a proxy server 28 performs this routing function. Thus, when a client device, such as mobile node 20, places a call, e.g., via wireless access point 14, proxy server 28 may engage in signaling, e.g., using SIP, to set up the call. In particular, if the call is an emergency services call, proxy server 28 may engage in signaling so that the call is set up to the appropriate PSAP, i.e., the PSAP that serves the area in which the originating access point is located.

Proxy server 28 may be able to access one or more databases that store information that can facilitate the routing of emergency services calls to the appropriate PSAP. For example, VoP network 12 may be communicatively coupled to a PSAP routing database 30. PSAP routing database 30 stores routing addresses for the PSAPs accessible via VoP network 12, i.e., routing addresses for PSAPs 22, 24, and 26. The routing addresses could be SIP addresses, e.g., in the case that SIP is used to set up calls through VoP network 12. However, other types of routing addresses could be used, e.g., if other protocols are used to route calls through VoP network 12.

PSAP routing database 30 may also store PSAP identifiers that identify the PSAPs. These PSAP identifiers may be the same identifiers provisioned in wireless access points 14, 16, and 18. More particularly, PSAP routing database 30 may store the PSAP identifiers so that they map to the routing addresses of the corresponding PSAPs. In this way, a PSAP identifier may be used to query database 30 and obtain the routing address that can be used to route an emergency services call to the PSAP corresponding to the PSAP identifier.

VoP network 12 may also be communicatively coupled to a PSAP coverage database 32. PSAP coverage database 32 stores information regarding which PSAPs are appropriate for answering emergency services calls from which access points. For example, PSAP coverage database 32 may store PSAP identifiers that identify PSAPs 22, 24, and 26 and may store access point identifiers that identify wireless access points 14, 16, and 18, such that the access point identifiers map to the PSAP identifiers of the PSAPs that serve the identified access points. As noted above, wireless access points 14, 16, and 18 may be provisioned with these access point identifiers and/or these PSAP identifiers. In this way, an access point identifier may be used to query database 32 and obtain the PSAP identifier of the PSAP appropriate for that access point.

Although FIG. 1 shows databases 30 and 32 as network elements separate from proxy server 28, it is to be understood that either of these databases could be integrated into proxy server 28. In addition, although FIG. 1 shows databases 30 and 32 as being separate from each other, it is to be understood that they could be part of the same database.

3. Exemplary Operation

Figure 2:
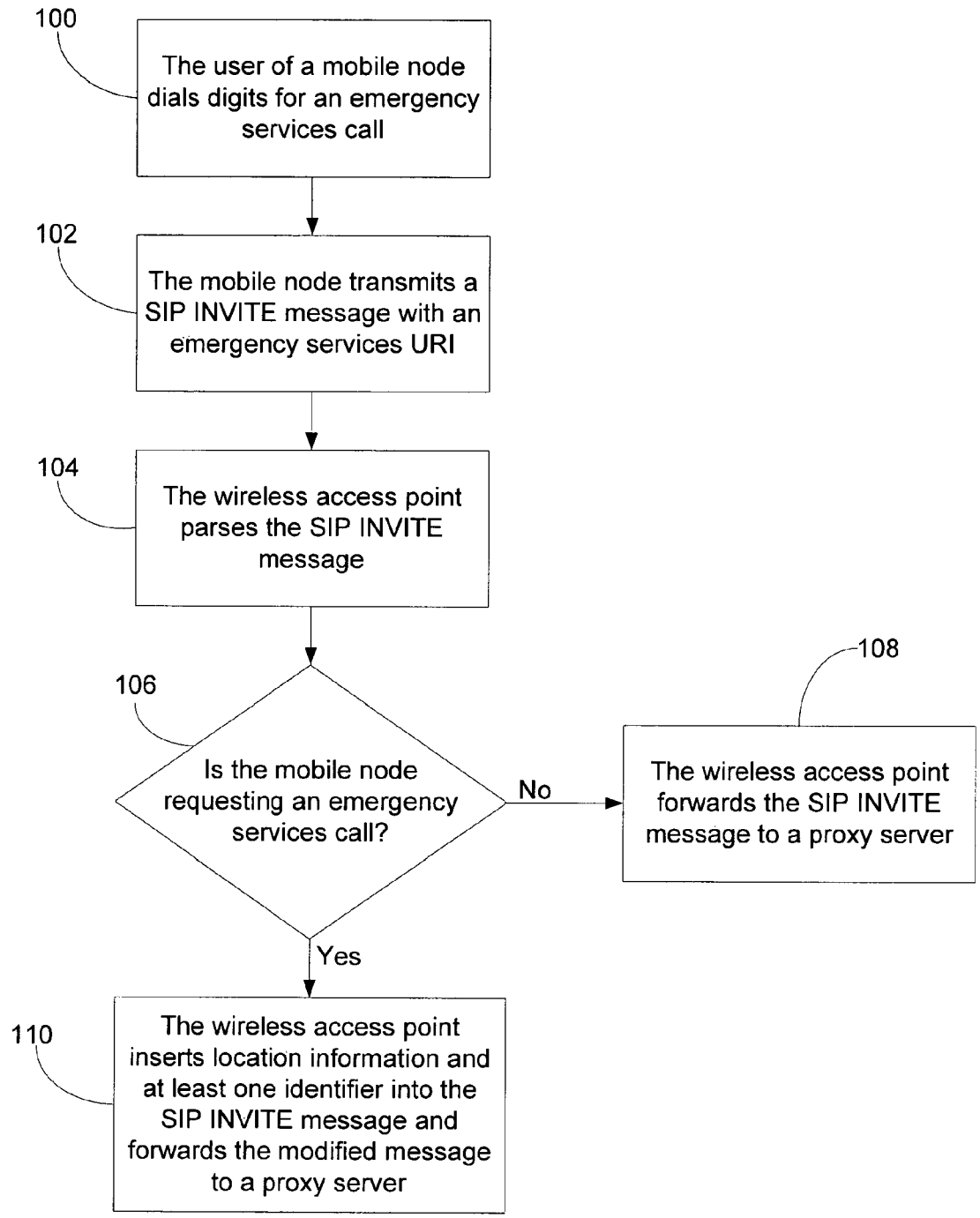
FIG. 2 is a flow chart illustrating a first part of a method for routing a voice over-packet emergency services call to an appropriate PSAP, in accordance with an exemplary embodiment of the present invention.
Figure 3:
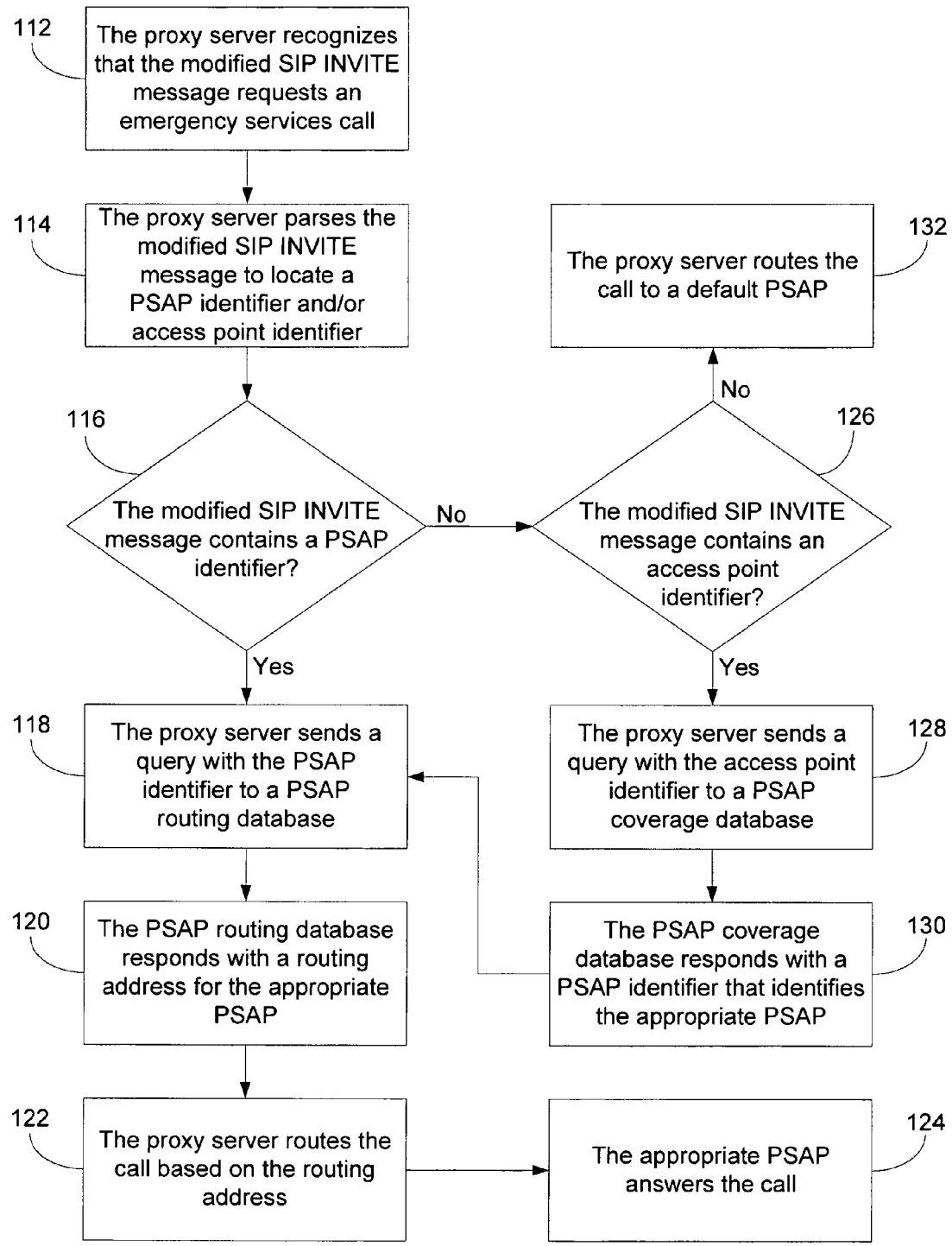
FIG. 3 is a flow chart illustrating a second part of a method for routing a voiceover-packet emergency services call to an appropriate PSAP, in accordance with an exemplary embodiment of the present invention.

FIGS. 2 and 3 are flow charts illustrating steps of an exemplary method of operation. In this exemplary operation, SIP is the signaling protocol used to set up calls in the VoP network. However, it is to be understood that SIP is exemplary only; other signaling protocols could be used. In addition, FIGS. 2 and 3 assume the network architecture shown in FIG. 1, though it is to be understood that other network architectures could be used.

With reference to FIG. 2, the process may begin when the user of a mobile node dials digits for an emergency services call, as indicated by block 100. The particular digits that the user dials may depend on the jurisdiction in which the user is located. For example, in many parts of the United States, an emergency services call can be placed by dialing "911." In other areas, particularly outside of the United States, other digits may be used to place emergency services calls. However, the dialed digits may indicate an emergency services call without specifying which particular PSAP should answer the call. For example, there are many PSAPs in the United States that answer 9-1-1 calls. Thus, FIGS. 2 and 3 illustrate an exemplary method for selectively routing an emergency services call to a particular PSAP, i.e., the PSAP that serves the area in which the caller is located, from among the various PSAPs that are also accessible via the VoP network.

In response to these dialed digits, the mobile node (e.g., mobile node 20 shown in FIG. 1) transmits a SIP INVITE message with an emergency services URI in a destination field, as indicated by block 102. The emergency services URI may include the digits that the user dialed, e.g., "911." Alternatively, the emergency services URI may include a designation other than the dialed digits to indicate that an emergency services call is being requested. For example, the emergency services URI may include an "sos" designation that could be used to indicate an emergency services call independently of the particular digits the user dialed. As noted above, such emergency services URIs indicate that an emergency services call is requested without specifying which particular PSAP should answer the call. In still other cases, the SIP INVITE message may include other types of information to indicate that the mobile node is requesting establishment of an emergency services call.

In this example, a wireless access point, e.g., wireless access point 14 in FIG. 1, receives the SIP INVITE message that the mobile node transmitted. The wireless access point then parses the SIP INVITE message to determine whether the mobile node is requesting an emergency services call, as indicated by block 104. The wireless access point might make this determination by checking whether the destination field contains an emergency services URI. For example, if the destination field contains a digit string, such as "911," or a designation, such as "sos," the wireless access point may determine that the mobile is requesting an emergency services call.

What the wireless access point does with the SIP INVITE message depends on whether the wireless access point determines that an emergency services call is being requested, as indicated by block 106. If the wireless access point determines that the mobile node is not requesting an emergency services call, then the wireless access point may simply forward the SIP INVITE message to a proxy server, e.g., proxy server 28 in FIG. 1, as indicated by block 108.

If the wireless access point determines that the mobile node is requesting an emergency services call, then the wireless access point may insert various types of information into the SIP INVITE message to provide a modified SIP INVITE message. For example, the wireless access point may insert one or more identifiers with which it has been provisioned, in order to facilitate routing to the appropriate PSAP. The wireless access point may also insert information regarding its location or the calling mobile node's location, so that the PSAP can receive a description of the caller's location. Thus, if the wireless access point determines that the mobile node is requesting an emergency services call, the wireless access point may create a modified SIP INVITE message by at least one identifier and location information into the mobile node's SIP INVITE message, and then forward the modified SIP INVITE message to the proxy server, as indicated by block 110.

The at least one identifier that the wireless access point inserts into the message may include a PSAP identifier and/or an access point identifier. As described above, the PSAP identifier identifies which PSAP serves the area in which the access point is located, and the access point identifier identifies the wireless access point. The PSAP identifier and/or access point identifier may have been provisioned into the wireless access point in advance of receiving the mobile node's SIP INVITE message. Alternatively, the wireless access point may obtain the PSAP identifier and/or access point identifier in response to the mobile node's message.

The location information that the wireless access point inserts into the message may describe the location of the wireless access point, e.g., in terms of a street address, section of a building, and/or latitude and longitude, based on information that has been provisioned into the wireless access point. Alternatively, the location information may describe the location of the mobile node placing the call, e.g., if the mobile node has determined its location, using GPS or some other means, and has communicated its determined location to the wireless access point.

FIG. 3 is a flowchart illustrating steps in the exemplary process after the wireless access point has forwarded the modified SIP INVITE message to the proxy server (block 110 in FIG. 2). As indicated by block 112, the proxy server receives the modified SIP INVITE message and recognizes (e.g., based on an emergency services URI in the destination field) that an emergency services call is being requested. In response, the proxy server parses the modified SIP INVITE message to locate a PSAP identifier and/or access point identifier, as indicated by block 114. How the proxy server proceeds may depend on whether the modified SIP INVITE message contains a PSAP identifier, as indicated by block 116.

If the modified SIP INVITE message contains a PSAP identifier, then the proxy server sends a query with the PSAP identifier to a PSAP routing database (e.g., database 30 in FIG. 1), as indicated by block 118. The PSAP routing database responds with a routing address that corresponds to the PSAP identifier, i.e., a routing address that can be used to route the emergency services call through the VoP network to the appropriate PSAP, as indicated by block 120. The proxy server then routes the call based on the routing address, as indicated by block 122. For example, the proxy server may forward the modified SIP INVITE message to the routing address obtained from the PSAP routing database.

The appropriate PSAP then answers the call, as indicated by block 124. In this way, a voice communication session is established between the mobile node and an appropriate PSAP, i.e., a PSAP that serves the area in which the mobile node is currently operating. The mobile node user may be able to speak to a live operator at the PSAP. In addition, the PSAP may obtain a description of the caller's location from the location information that the wireless access point inserted into the SIP INVITE message.

With reference to block 116, if the modified SIP INVITE message that the wireless access point transmitted does not contain a PSAP identifier, then the proxy server may determine whether the modified SIP INVITE message contains an access point identifier, as indicated by block 126. If the modified SIP INVITE message contains an access point identifier, then the proxy server sends a query with this access point identifier to a PSAP coverage database (e.g., database 32 in FIG. 1), as indicated by block 128. The PSAP coverage database responds with the PSAP identifier that identifies the appropriate PSAP, i.e., the PSAP that covers the area in which the identified wireless access point is located, as indicated by block 130. The proxy server then uses this PSAP identifier to query the PSAP routing database, i.e., proceeds to block 118.

If, however, the proxy server is unable to locate either a PSAP identifier or an access point identifier, then the proxy server may use an alternate approach to determine how to route the emergency services call. For example, the proxy server may simply route the call to a default PSAP, as indicated by block 132.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of setting up an emergency services call between a mobile client device and a corresponding one of a plurality of public safety answering points according to a current geographic location of the mobile client device, wherein the mobile client device roams over a voice-over-packet network comprised of a plurality of wireless access points each having a respective wireless coverage area, comprising the steps of:
   one of the wireless access points to which the mobile client device has roamed on the network receiving a request for an emergency services call from the mobile client device, wherein the request identifies the call as being for emergency services but does not identify any public safety answering point;
   the wireless access point parsing the request to determine whether it is for emergency services;
   in response to detecting the emergency services request, the wireless access point inserting a location identifier into the request and forwarding a modified request to a proxy server coupled to the voice-over-packet network, wherein the location identifier is comprised of one of a wireless access point identifier or a public safety answering point identifier that is stored in the respective wireless access point receiving the request;
   the proxy server receiving the modified request and determining if the location identifier is a public safety answering point identifier;
   if the location identifier is not a public safety answering point identifier, then the proxy server using the location identifier to retrieve a corresponding public safety answering point identifier from a public safety answering point coverage database;
   the proxy server using the public safety answering point identifier to retrieve a routing address from a routing database; and
   the proxy server setting up the emergency services call between the mobile client device and the public safety answering point located at the retrieved routing address.

2. The method of claim 1 wherein the voice-over-packet network includes a wireless local area network (WLAN).

3. The method of claim 1 wherein the location identifier may be further comprised of GPS coordinates.

4. The method of claim 1 wherein the proxy server is comprised of a Session Initiation Protocol (SIP) server, and wherein the request is comprised of a SIP Invite message.

5. The method of claim 4 wherein the SIP Invite message includes an emergency services URI to identify the call as being for emergency services.

6. The method of claim 5 wherein the emergency services URI is comprised of a 911 dialing sequence.

7. The method of claim 1 wherein, if the location identifier is missing or invalid within the request, then the proxy server sets up the emergency services call between the mobile client device and a default public safety answering point.

8. A system for selectively routing calls in a network that includes a voice-over-packet network from a mobile client device to one of a plurality of public safety answering points according to a current geographic location of the mobile client device, comprising:
   a plurality of wireless access points communicatively coupled to the voice-over-packet network, wherein the mobile client device roams over the voice-over-packet network as it moves through respective wireless coverage areas corresponding to the plurality of wireless access points, wherein each wireless access point stores a respective location identifier comprised of one of a wireless access point identifier or a public safety answering point identifier, wherein a wireless access point to which the mobile client device is connected receives a request for an emergency services call from the mobile client device, wherein the request identifies the call as being for emergency services but does not identify any public safety answering point, wherein the wireless access point parses the request to determine whether it is for emergency services, and wherein the wireless access point inserts its respective location identifier into the request to form a modified request in response to detecting the emergency services request; and
   a proxy server coupled to the voice-over-packet network, wherein the proxy server receives the modified request from the wireless access point and determines whether the location identifier is a public safety answering point identifier, wherein if the location identifier is not a public safety answering point identifier then the proxy server uses the location identifier to retrieve a corresponding public safety answering point identifier from a public safety answering point coverage database, wherein the proxy server uses the public safety answering point identifier to retrieve a routing address from a routing database, and wherein the proxy server sets up the emergency services call between the mobile client device and the public safety answering point located at the retrieved routing address.

9. The system of claim 8 wherein the voice-over-packet network is comprised of a wireless local area network (WLAN).

10. The system of claim 8 wherein the location identifier may be further comprised of GPS coordinates.

11. The system of claim 8 wherein the proxy server is comprised of a Session Initiation Protocol (SIP) server, and wherein the request is comprised of a SIP Invite message.

12. The system of claim 11 wherein the SIP Invite message includes an emergency services URI to identify the call as being for emergency services.

13. The system of claim 12 wherein the emergency services URI is comprised of a 911 dialing sequence.

14. The system of claim 8 wherein, if the location identifier is missing or invalid within the request, then the proxy server sets up the emergency services call between the mobile client device and a default public safety answering point.

* * * * *